No. 724,299. PATENTED MAR. 31, 1903.
C. C. KNOBEL.
WATER TROUGH.
APPLICATION FILED NOV. 20, 1902.
NO MODEL.

WITNESSES:

INVENTOR
Charles C. Knobel
BY
Thomas D. Mowly
ATTORNEY.

UNITED STATES PATENT OFFICE.

CHARLES C. KNOBEL, OF PHILADELPHIA, PENNSYLVANIA, ASSIGNOR OF ONE-HALF TO THOMAS W. GREEN, OF PHILADELPHIA, PENNSYLVANIA.

WATER-TROUGH.

SPECIFICATION forming part of Letters Patent No. 724,299, dated March 31, 1903.

Application filed November 20, 1902. Serial No. 132,068. (No model.)

*To all whom it may concern:*

Be it known that I, CHARLES C. KNOBEL, a citizen of the United States, residing in Philadelphia, in the county of Philadelphia and State of Pennsylvania, have invented certain new and useful Improvements in Water-Troughs; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to horse-watering troughs that are placed outside of the stable or in the street; and the object of my improvement is to so construct the trough that it can be easily and quickly cleaned and emptied of any accumulations of ice or other material. To accomplish the desired result, I make the trough preferably in the form of an arc of a circle and mount it on suitable supports located at the ends thereof in such a way that the trough can be easily and quickly turned partially over or completely upside down.

Figure 1:
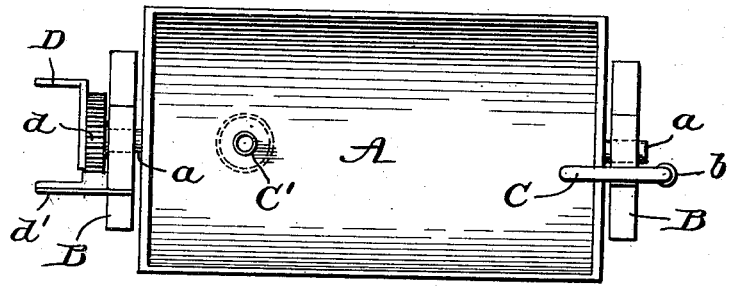
Figure 2:
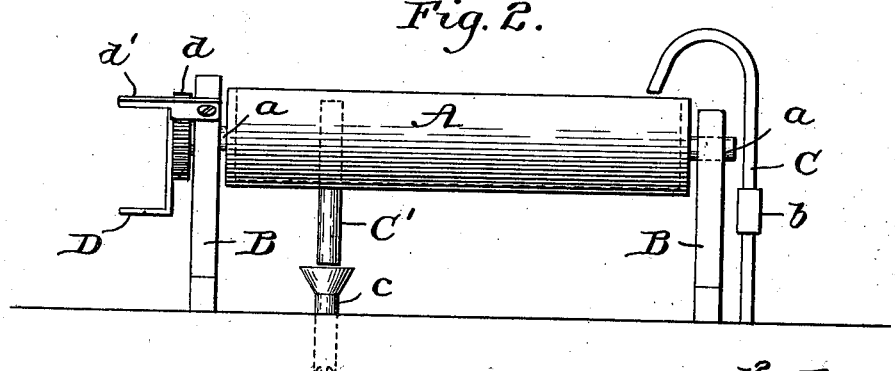
Figure 3:
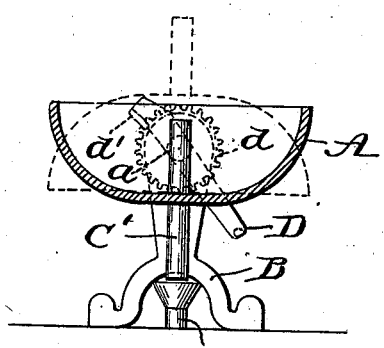
Figure 4:
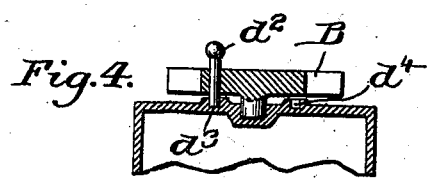
Figure 5:
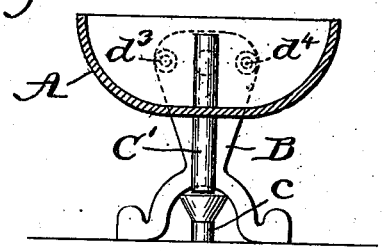

In the accompanying drawings, Figure 1 is a plan view of my improved trough. Fig. 2 is a side elevation of the trough. Fig. 3 is a vertical cross-sectional view through the middle of the trough. Figs. 4 and 5 show a modified form of supporting the trough.

A represents the trough, which is preferably made of iron and formed to the shape shown in the drawings.

$a$ $a$ are trunnions cast on the ends of the trough.

B B are upright supports for the trough. These supports are provided with suitable openings into which the trunnions $a$ $a$ fit.

C is the pipe through which the water flows into the trough. This pipe has a joint or connection at $b$, that will allow it to be turned around out of the way of the trough when it is necessary to turn the trough over.

C' is an overflow-pipe registering with a suitable drain-pipe $c$, that conveys the overflowing water away from the trough.

D is a handle secured upon the end of the trunnion $a$.

$d$ is a notched wheel on the trunnion $a$ inside of the handle D.

$d'$ is a latch pivotedly secured on the side of the support B and adapted to fit into the notches in the wheel $d$.

In use the trough is in the position shown in the drawings. When it it desirable to clean it of any ice that may have become frozen in it in winter, the trough is turned upside down in the position indicated by the dotted line in Fig. 3, and the ice and other accumulations will ordinarily drop out. Should the contents of the trough be frozen solidly to the bottom and not fall out when the trough is turned over, it will only be necessary to pour hot water over the upturned bottom. If it is desired to clean the trough of the ordinary sediment or rubbish that may have accumulated therein, it will only be necessary to turn it partially over. The pivoted latch $d'$, fitting into one of the notches on the wheel $d$, will hold the trough in any desired position, so that said trough may be tilted and maintained in such position to permit small animals to drink therefrom.

Any other convenient means than that shown may be employed for tilting the trough, and, if desired, instead of having the trunnions or cylindrical projections $a$ $a$ formed on the ends of the trough and extending into the supports B B projections may be cast on the inside of said supports and extend into depressions or holes formed in the ends of the trough, as shown in Fig. 4. Made in this way the pin $d^2$, extending through a hole in one of the supports B and fitting into a corresponding opening $d^3$ in the end of the trough, will hold it in the upright position. When the trough is turned upside down, the opening $d^4$ will come opposite to the pin $d^2$, which can be inserted therein, thus holding the trough in the turned-over position.

Having thus described my invention, what I claim as new, and desire to secure by Letters Patent of the United States, is—

1. In a tilting water-trough, the combination with suitable supports of a trough journaled in said supports, said trough having one of its trunnions extended and provided with a notched wheel and an operating-handle, and a pivoted latch arranged to engage said notches of the wheel whereby the trough may be set to and held at any required angle, or be completely reversed.

2. The combination with a revolubly-supported watering-trough, of an overflow-pipe, whereby the water is prevented from running over the sides of the trough, and means for setting said trough at any required angle, or completely reversing the same, as desired.

3. The combination with a revolubly-supported water-trough provided with an overflow-pipe, whereby the contents of said trough is prevented from overflowing its sides, of a notched wheel and an operating-lever secured on one of the trunnions of the revolubly-supported trough, and a latch arranged, whereby said trough may be set at any required angle, or completely reversed.

In testimony whereof I affix my signature in presence of two witnesses.

CHARLES C. KNOBEL.

Witnesses:
 THOS. D. MOWLDS,
 SAML. F. KIRKPATRICK.